United States Patent
Doane

(10) Patent No.: US 8,408,380 B2
(45) Date of Patent: Apr. 2, 2013

(54) CONVEYOR INDUCT

(75) Inventor: Martin R. Doane, Rockford, MI (US)

(73) Assignee: Dematic Corp., Grand Rapids, MI (US)

( * ) Notice: Subject to any disclaimer, the term of this patent is extended or adjusted under 35 U.S.C. 154(b) by 188 days.

(21) Appl. No.: 12/870,073

(22) Filed: Aug. 27, 2010

(65) Prior Publication Data

US 2011/0048894 A1 Mar. 3, 2011

Related U.S. Application Data

(60) Provisional application No. 61/237,953, filed on Aug. 28, 2009, provisional application No. 61/238,878, filed on Sep. 1, 2009.

(51) Int. Cl.
*B65G 47/31* (2006.01)

(52) U.S. Cl. .................. 198/460.1; 198/461.1

(58) Field of Classification Search ............... 198/460.1, 198/444, 358, 349, 461.1
See application file for complete search history.

(56) References Cited

U.S. PATENT DOCUMENTS

| | | | |
|---|---|---|---|
| 3,817,368 A | 6/1974 | Wentz et al. | |
| 4,227,607 A * | 10/1980 | Malavenda | 198/460.1 |
| 4,358,472 A | 11/1982 | Small et al. | |
| 4,369,876 A | 1/1983 | Small et al. | |
| 4,518,075 A * | 5/1985 | Aykut et al. | 198/460.1 |
| 4,915,209 A | 4/1990 | Canziani | |
| 5,092,451 A | 3/1992 | Jones et al. | |
| 5,267,638 A | 12/1993 | Doane | |
| 5,268,638 A | 12/1993 | Brunner et al. | |
| 5,341,916 A * | 8/1994 | Doane et al. | 198/460.1 |
| 5,738,202 A | 4/1998 | Ydoate et al. | |
| 5,979,636 A | 11/1999 | Vanacore et al. | |
| 6,513,641 B1 | 2/2003 | Affaticati et al. | |
| 6,629,593 B2 * | 10/2003 | Zeitler | 198/460.1 |
| 6,715,598 B2 | 4/2004 | Affaticati et al. | |
| 6,751,524 B2 | 6/2004 | Neary et al. | |
| 6,918,484 B2 | 7/2005 | Affaticati et al. | |

(Continued)

FOREIGN PATENT DOCUMENTS

WO 99/41169 A1 8/1999

OTHER PUBLICATIONS

PCT Search Report and Written Opinion of the International Searching Authority regarding PCT/US2010/046959, the international counterpart to the present application.

(Continued)

*Primary Examiner* — Gene Crawford
*Assistant Examiner* — Keith R Campbell
(74) *Attorney, Agent, or Firm* — Gardner, Linn, Burkhart & Flory, LLP

(57) ABSTRACT

An induction subsystem for a conveying system includes a plurality of induction conveying units that are controlled by a plurality of controls in a manner that delivers articles to a release conveyor with gaps between the articles that approach a desired length. The conveying units may be controlled using algorithms that examine a planned release time for an article and a time at which the article would be released were it to complete the rest of its travel through the induction subsystem at one or more nominal speeds. The difference is used to determine an appropriate speed for at least one of the conveying units. The conveying unit may alternatively be controlled using algorithms that determine desired speed ratios for the conveying units, and which may seek to control the centerline to centerline spacing of articles as they reach the release point such that desired gaps are created.

23 Claims, 6 Drawing Sheets

U.S. PATENT DOCUMENTS

| | | | |
|---|---|---|---|
| 7,121,398 B2 * | 10/2006 | Affaticati et al. | 198/357 |
| 7,191,895 B2 | 3/2007 | Zeitler et al. | |
| 7,263,409 B2 | 8/2007 | LeVasseur et al. | |
| 7,413,071 B2 | 8/2008 | Zeitler et al. | |
| 7,467,708 B2 | 12/2008 | McGettigan et al. | |
| 7,562,760 B2 | 7/2009 | Affaticati et al. | |
| 7,631,747 B2 | 12/2009 | Zeitler | |

OTHER PUBLICATIONS

Claims of PCT/US2010/046959 as of Oct. 15, 2010.
International Preliminary Report on Patentability from corresponding Patent Cooperation Treaty (PCT) Patent Application No. PCT/US2010/046959, mailed Mar. 8, 2012.

* cited by examiner

CONVEYOR INDUCT

CROSS-REFERENCE TO RELATED APPLICATIONS

This application claims priority to U.S. provisional application Ser. No. 61/237,953 filed Aug. 28, 2009, by Martin Doane and entitled CONVEYOR INDUCT, and U.S. provisional application Ser. No. 61/238,878 filed Sep. 1, 2009, by Martin Doane and entitled CONVEYOR INDUCT, the complete disclosures of both of which are hereby incorporated herein by reference in their entirety.

BACKGROUND OF THE INVENTION

The present invention relates to conveyor systems, and more particularly to the induction section of a conveyor system.

Induction subsystems of conveying systems often serve the function of preparing articles on the conveying systems for being processed by a downstream sortation system. Such processing typically involves controlling the articles in such a way that the articles leaving the induction subsystem have gaps between them that are close to a desired length. The desired length may be variable depending upon the length and/or width of one or more of the pair of articles that define the gap, or the desired length may be constant. Regardless of the criteria used to determine the length of the desired gap, the gap serves the purpose of facilitating the sortation of the articles. That is, sortation subsystems often function more effectively if the articles being sorted have a certain minimum gap between them. However, gaps exceeding this minimum will generally decrease the throughput of the conveying system. It is therefore desirable to create gaps that balance sortation criteria with acceptable throughput criteria.

SUMMARY OF THE INVENTION

The present invention relates to an improved induct subsystem that controls articles on a series of conveyors in a manner that results in a gap between the articles being formed, wherein a size of the gap approaches a desired length. In at least one embodiment, the system controls a series of sequentially arranged conveying surfaces by determining estimated times of arrival of the articles at a downstream release point and adjusting speeds, as necessary, of the conveying surfaces in order to deliver the articles to the release point at a desired time.

According to one embodiment, a conveyor induct system is provided that includes a plurality of sequentially arranged conveying surfaces, at least one article sensor, and a control. The plurality of conveying surfaces includes at least a first conveying surface and at least a second conveying surface wherein the second conveying surface is positioned downstream of the first conveying surface. The article sensor is positioned adjacent to at least one of the conveying surfaces. The control is responsive to the at least one article sensor and uses the article sensor to determine an estimated time of arrival of an article on the first conveying surface at a release location downstream of the second conveying surface. The control further uses the estimated time of arrival to make adjustments to a speed of the first conveying surface in order to facilitate arrival of the article at the release location at a desired time. The first conveying surface may be the leading conveying surface in the induct system, or it may be preceded my one or more upstream conveying surfaces defined within the induct system.

According to another embodiment, a conveyor induct system is provided that includes a plurality of sequentially arranged conveying surfaces, at least one article sensor, and a control. The plurality of sequentially arranged conveying surfaces are positioned upstream of a release location and include at least a pre-release conveying surface positioned adjacent to, and upstream of, the release location. The plurality of sequentially arranged conveying surfaces further includes an upstream conveying surface positioned upstream of said pre-release conveying surface. The article sensor is positioned adjacent to one or more of the conveying surfaces. The control uses the article sensor to determine an estimated time of arrival of an article on the upstream conveyor at the release location. The control further uses the estimated time of arrival to make adjustments to a speed of the upstream conveying surface in order to facilitate arrival of the article at the release location at a desired time.

According to another embodiment, a method is provided for inducting articles in order to achieve a desired gap between leading and trailing edges of the articles. The method comprises controlling a first induct conveying surface such that the first induct conveying surface operates at a speed that will deliver an article on the first induct conveying surface to a downstream end of the first induct conveying surface at a first desired time. The method further includes controlling a second induct conveying surface, after the article arrives thereon, such that the second induct conveying surface operates at a speed that will deliver the article to a downstream end of the second induct conveying surface at a second desired time.

According to other embodiments, the control may determine the desired time based at least partially upon a planned arrival time of a downstream neighboring article. A third conveying surface may be positioned downstream of the second conveying surface and upstream of the release location. Each conveying surface may also be assigned a nominal speed value and the control may determine the desired time based at least partially upon the nominal speed of at least one of the conveying surfaces. The control may also use the nominal speed values of the conveying surfaces in determining the estimated time of arrival. The nominal speed values may be assigned such that the nominal speed value of a conveying surface is greater than or equal to the nominal speed of its upstream neighboring conveying surface and less than or equal to the nominal speed of its downstream neighboring conveying surface. The control may also determine if the second conveying surface is unoccupied and, if it is unoccupied, the control may control the speed of the second conveying surface such that it matches the speed of the first conveying surface. The system may also include, in some embodiments, at least four more conveying surfaces positioned downstream of the second conveying surface and upstream of the release location. All of the conveyors in the induction system may be adjustable speed conveying surfaces whose speed may be changed by the control.

According to another embodiment, a conveyor induct system is provided that includes a plurality of sequentially arranged conveying surfaces, at least one article sensor, and a control. The article sensor is positioned adjacent to at least one of the conveying surfaces. The control is responsive to the article sensor and uses the article sensor to determine the distance between a downstream edge of a control region of a first article and an upstream edge of a control region of a second article, wherein the second article is positioned downstream of the first article. The control is further adapted to control a ratio of the speed of the first one of the conveying surfaces to a speed of the second one of the conveying surfaces. The ratio is determined based at least partially upon the determined distance.

According to another embodiment, a conveyor system is provided that includes a merge subsystem, a sortation subsystem, and an induct subsystem. The induct subsystem is positioned downstream of the merge subsystem and upstream of the sortation subsystem, and the induct subsystem feeds articles to the sortation subsystem. The induct subsystem further includes a plurality of sequentially arranged conveying surfaces, at least one article sensor, and a control. The plurality of conveying surfaces include a downstream-most conveying surface that delivers articles to a release conveyor. The article sensor is positioned adjacent to at least one of the plurality of conveying surfaces. The control uses the article sensor to control a speed of the downstream-most conveying surface at a desired ratio with respect to a speed of the release conveyor. The conveyor induct subsystem is further adapted not to make any changes to gaps between articles after the articles are positioned on the release conveyor.

According to still another embodiment, a conveyor induct system is provided that includes a plurality of sequentially arranged conveying surfaces, at least one article sensor, and a control. The plurality of sequentially arranged conveying surfaces includes at least a first conveying surface, at least a second conveying surface, at least a third conveying surface, and at least a downstream-most conveying surface that delivers articles to a release conveyor. The article sensor is positioned adjacent to at least one of the plurality of conveying surfaces. The control controls a first ratio of a speed of the first conveying surface relative to a speed of the second conveying surface, a second ratio of the speed of the second conveying surface relative to a speed of the third conveying surface, and a third ratio of a speed of the downstream-most conveying surface relative to a speed of the release conveyor. The conveyor induct system makes no changes to gaps between articles after the articles are positioned on the release conveyor.

According to another embodiment, a conveyor induct system is provided that includes a plurality of adjustable speed induct conveyors defining a series of sequentially arranged conveying surfaces, at least one article sensor, and a control. The series of sequentially arranged conveying surfaces define a series of conveying surface interfaces. The article sensor detects articles on the conveying surfaces, and the control adjusts a ratio of speeds between each conveying surface in each conveying surface interface using an algorithm. The algorithm is the same algorithm for at least a plurality of conveying surface interfaces in the conveyor induct system. In other embodiments, the algorithm may be the same algorithm for every one of the conveying surface interfaces in the conveyor induct system.

According to another embodiment, a method of inducting articles in order to achieve a desired gap between leading and trailing edges of articles is provided. The method includes controlling a first induct conveyor such that the first induct conveyor operates at a speed that is a first ratio of a speed of a second induct conveyor. The second induct conveyor is located immediately downstream of the first induct conveyor. The method further includes controlling the second induct conveyor such that the second induct conveyor operates at a speed that is a second ratio of a speed of a third induct conveyor. The third induct conveyor is located immediately downstream of the second induct conveyor. The method further includes adjusting the first and second ratios in order to achieve the desired gap between articles. In other embodiments, additional induct conveyors may be added beyond the first, second, and third induct conveyors. The additional induct conveyors may be positioned either upstream of, or downstream of, the first, second, and third induct conveyors. The ratios between the additional induct conveyors may be adjusted to achieve the desired gap between articles.

According to still other embodiments, the speed ratios used to control the relative speeds of adjacent conveyors may be based upon one or more anticipated speed ratios of downstream pairs of conveying surfaces. The speed ratios may also be based, at least partially, upon distances between control regions of adjacent articles. In other embodiments, the speed ratios may be based, at least partially, upon the distances between centerlines of adjacent articles. Adjustments to the speed ratios may also be made based at least partially upon a distance of the downstream edge of the control region of a first article to a downstream edge of the conveying surface on which the article is currently positioned. The number of sequentially arranged conveying surfaces may be as high as seven or more, although other embodiments contemplate as few as three sequentially arranged conveying surfaces. The article sensor may comprise a series of photo-eyes positioned alongside the conveying surfaces, or a horizontal array of sensors and detectors that emit and detect, respectively, any suitable form of electromagnetic waves, such as light, infrared, etc. The conveying surfaces may be defined by endless belts, or other types of materials.

DETAILED DESCRIPTION OF THE EMBODIMENTS

Figure 1:
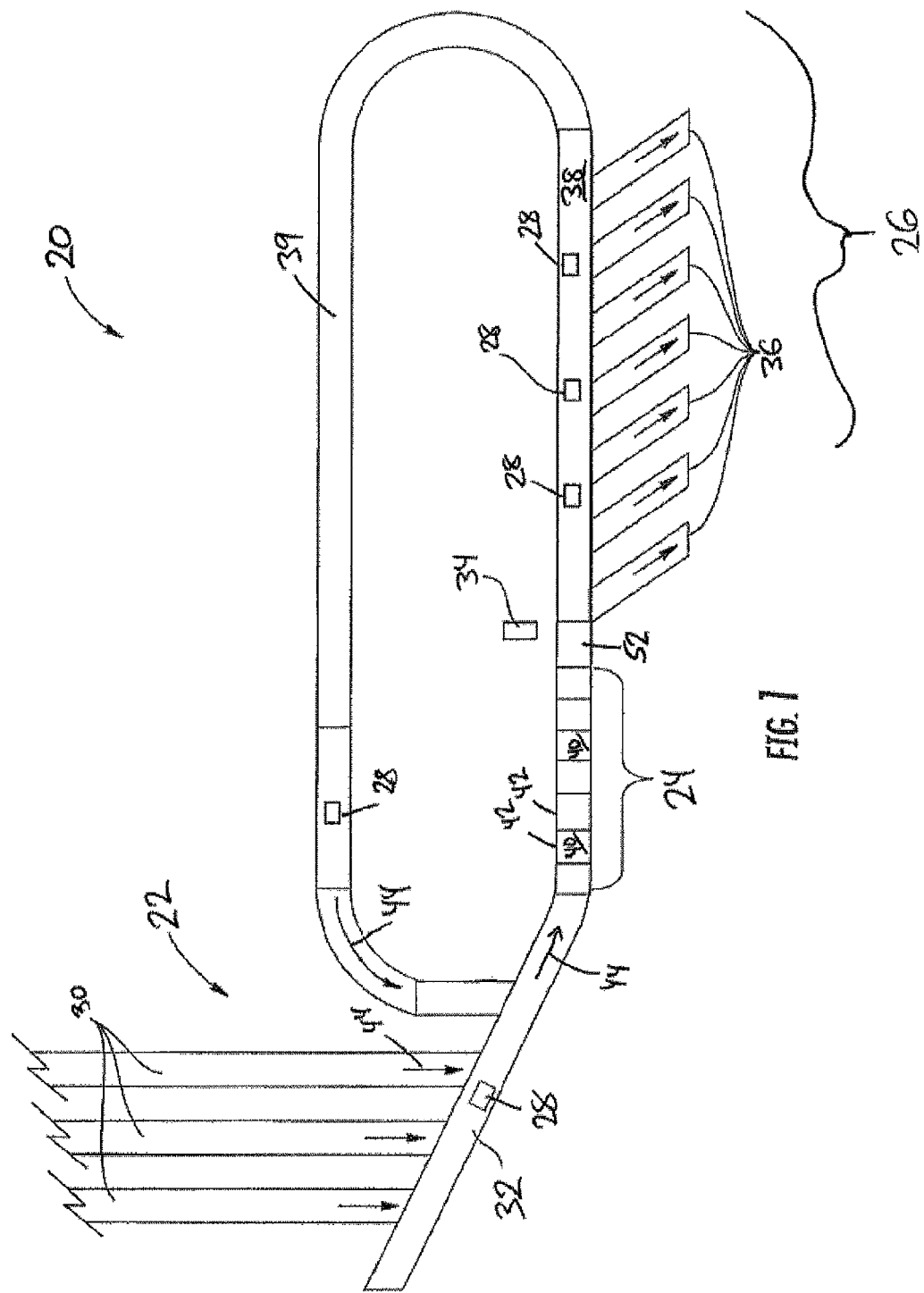
FIG. 1 is a plan view diagram of an illustrative and arbitrary example of a conveying system.

A conveying system 20 according to one embodiment is depicted in plan view in FIG. 1. The layout of conveying system 20 shown in FIG. 1 is an arbitrary layout that has been selected for purposes of further understanding the various embodiments. The layout of an actual conveying system will vary from that shown in FIG. 1 depending upon the warehouse or other facility in which the system 20 is incorporated. In general, conveying system 20 is adapted to convey articles 28, such as packages, retail products, etc. using a plurality of conveyors from a first location or set of locations to a destination or set of destinations. Conveying system 20 may be used in a product distribution center, a warehouse, a factory, a receiving and sortation facility, or other types of buildings or structures. The types of articles 28 that may be transported by conveying system 20 can vary widely, and it will be understood by those skilled in the art that the sizes and rectangular shapes of the articles 28 depicted in FIG. 1 are merely illustrative and not limiting. Articles 28 of different size and shape may be conveyed by conveying system 20, including articles 28 of different size and shape that are carried on the same system 20.

Conveying system 20 includes a merge subsystem 22, an induction subsystem 24, and a sortation subsystem 26. Merge subsystem 22 merges a plurality of infeed conveying lines 30 onto a merge bed 32 that then delivers the articles to induction subsystem 24. Induction subsystem 24 generally functions to adjust the gaps between adjacent articles 28 before they are fed to sortation subsystem 26. One or more bar code scanners 34, or other types of sensing devices, may be positioned adjacent the upstream end of sortation subsystem 26 and adapted to read bar codes, or other identifying indicia, contained on the articles 28 and use the read information to determine the destination of each article 28. The determined destination is forwarded to a controller that controls sortation subsystem 26. Sortation subsystem 26 uses this information to determine which of multiple take-away conveyors or receptacles 36 each article 28 should be delivered to.

In the example illustrated in FIG. 1, sortation subsystem 26 may be a linear, positive displacement sorter that diverts articles off of a main conveying surface 38 onto the adjacent take-away conveyors or receptacles 36. Articles that fail to be diverted onto a takeaway conveyor or receptacle 36 may be delivered to a recirculation line 39 that conveys the articles back to merge subsystem 22 where the articles are once again fed to merge bed 32, induction subsystem 24, and sortation subsystem 26. It will be understood that the types of merge subsystems 22, induct subsystems 24, and sortation subsystems 26 that may be used in accordance with the principles discussed herein can vary from that shown in FIG. 1. Merge subsystem 22 may merge fewer or greater numbers of infeed lines 30, may be arranged in geometrically different layouts, and may be varied in other manners. Sortation subsystem 26 may be varied to include a carousel type sorter, a tilt-tray sorter, a linear positive displacement sorter with a different size and/or shape from that of FIG. 1, as well as other types of sortation conveyors. Induct subsystem 24 may also be varied from that shown in FIG. 1, as will be discussed in greater detail below, and, in some embodiments, may induct multiple lines into a single conveying line that is then fed into sortation subsystem 26.

Figure 2:
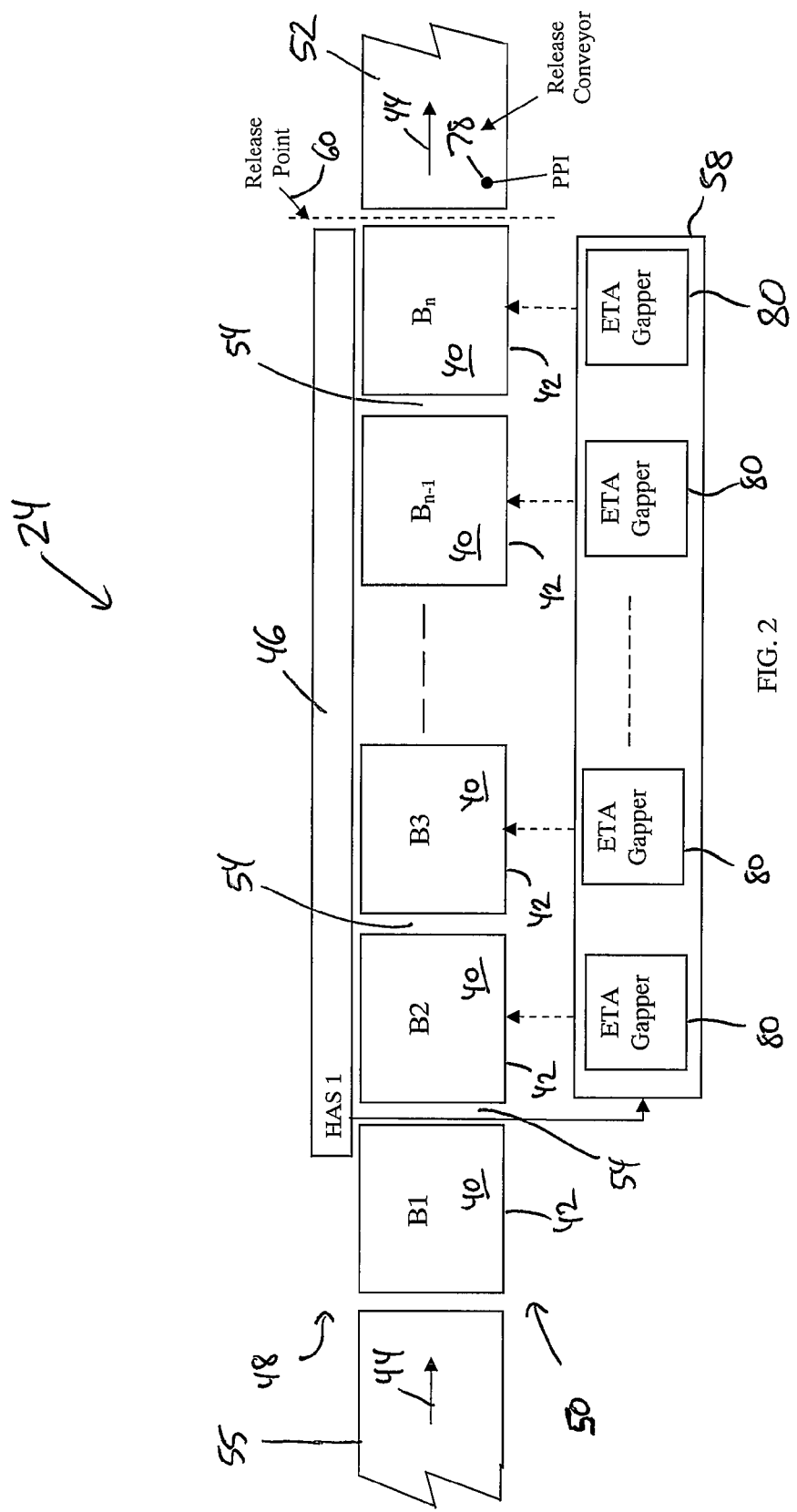
FIG. 2 is a plan view diagram of a conveyor induct subsystem according to a first embodiment.
Figure 3:
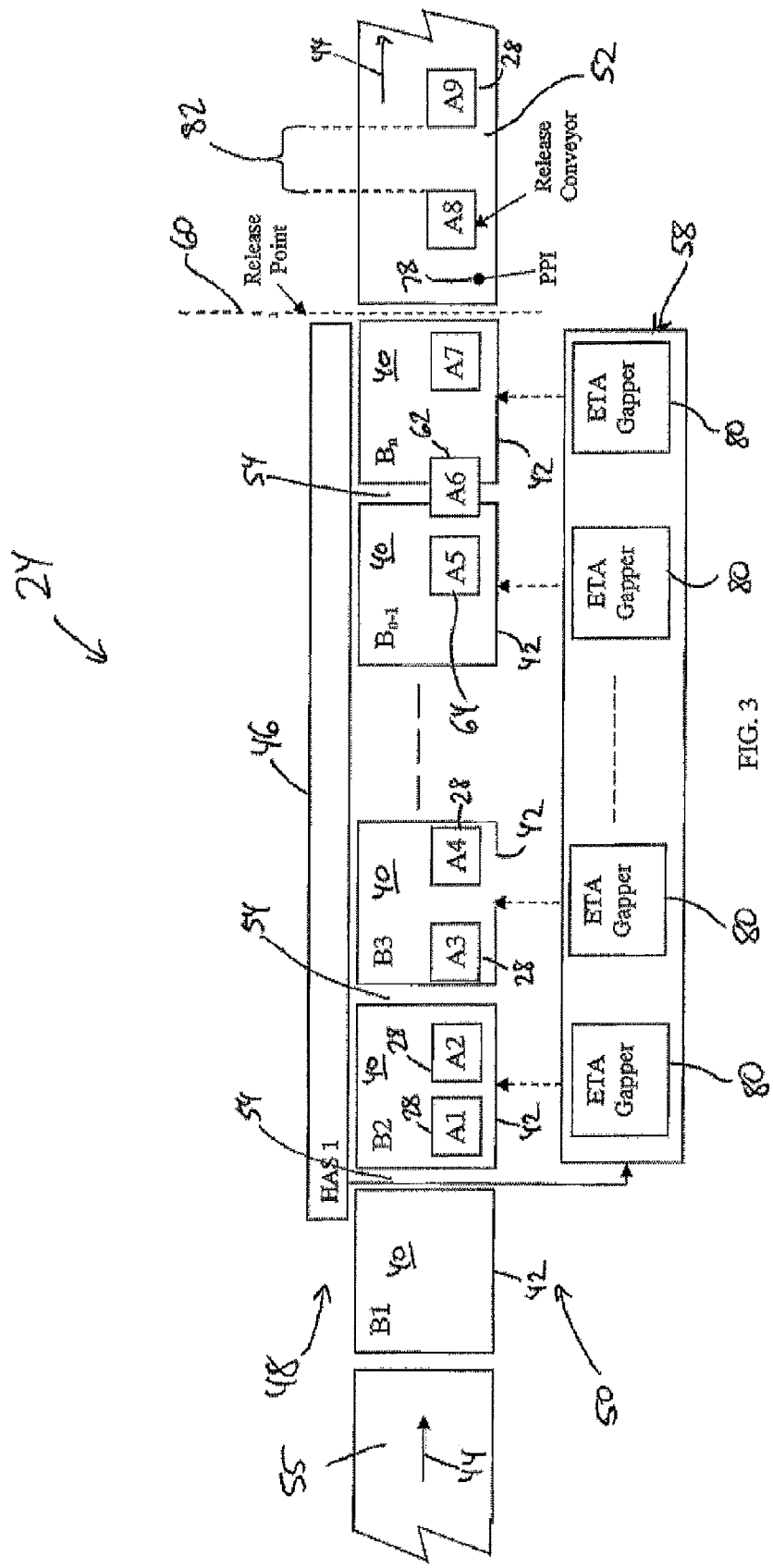
FIG. 3 is a plan view diagram of the conveyor induct subsystem of FIG. 2 shown with an arbitrary arrangement of articles positioned on various of the conveying surfaces.

Induct subsystem 24 is shown in greater detail in FIGS. 2 and 3. FIG. 2 illustrates induct subsystem 24 without any articles positioned on a plurality of conveying surfaces 40. FIG. 3 illustrates induct subsystem 24 with a plurality of articles 28 that have been positioned thereon in an arbitrary arrangement in order to better illustrate various details of the control algorithms that may be utilized for controlling the conveying surfaces 40 of induct subsystem 24. As can be seen in both FIGS. 2 and 3, induct subsystem includes a plurality of induct conveyors 42 that are sequentially arranged. Induct conveyors 42 have been labeled in FIGS. 2 and 3 as B1, B2, B3, $B_{N-1}$, and $B_N$ in order to illustrate that the precise number of induct conveyors 42 that may be used in induct subsystem 24 may be varied. In at least one embodiment, induct subsystem 24 may have as few as two induct conveyors 42. In other embodiments, induct subsystem 24 may have any number of induct conveyors greater than two, including configurations that include as many as seven or more induct conveyors 42.

An arrow 44 illustrates the direction in which articles move across induct subsystem 24. For purposes of the description herein, the terms upstream and downstream will be used to indicate the relative position of objects with respect to movement direction 44. Thus, in the example shown in FIGS. 2 and 3, induct conveyor B1 is positioned upstream of conveyors B2, B3, $B_N$, and $B_{N-1}$, while conveyor $B_N$ is positioned downstream of all of the other induct conveyors 42. For purposes of description herein, conveyor $B_N$ will be referred to as a pre-release conveyor because it immediately precedes a release conveyor 52, unless explicitly described otherwise herein. Pre-release conveyor $B_N$ operates according to the same principles as all the other induct conveyors 42.

Each induct conveyor 42 may be a belted conveyor. That is, the conveying surface 40 of each induct conveyor 42 may be defined by an endless belt that is reeved around a plurality of rollers, one of which is positioned adjacent an upstream end of the conveyor 42 and another of which is positioned adjacent a downstream end of the conveyor 42. The physical construction of the belted conveyors 42, as well as the neighboring conveyors, may take on a variety of different forms and is not intended to be limited by the control algorithms disclosed herein. As one example, the physical construction of these conveyors may take on the form disclosed in commonly assigned U.S. Pat. No. 7,191,895 issued to Zeitler et al. and entitled Conveyor Induct System with Probability Estimator. Other constructions are also possible.

A horizontal array sensor 46 is positioned alongside a first side 48 of multiple ones of the induct conveyors 42. Horizontal array sensor 46 is adapted to detect the presence and relative position of articles that are traveling on the induct conveyors 42 that are positioned adjacent sensor 46. While horizontal array sensor 46 may take on other forms, in the embodiment shown in FIGS. 2 and 3, sensor 46 is a sensor comprised of an array of horizontal light beams that are emitted across conveying surfaces 40 to an array of detectors (not shown) positioned on a second side 50 of induct conveyors 42. Alternatively, one or more reflectors may be positioned on second side 50 that reflect the light beams emitted from array 46 back to one or more detectors incorporated into, or positioned adjacent to, array 46. In one embodiment, horizontal array sensor 46 may be a conventional array of photo-detectors, such as those commercially available from Kore Computing of Comstock Park, Mich., or SICK, Inc. of Bloomington, Minn. Other types of photo-detectors may also be used, including, but not limited to, infrared sensors, laser sensors, cameras, pulse-position indicators, encoders, and other devices. Regardless of the type of physical sensors used, sensor 46 is able to detect the position of articles 28 traveling through induct subsystem 24. The manner in which sensor 46 makes this detection may vary, but may involve detecting the trailing and leading edges of articles 28 as they pass by sensor 46 and block and unblock the electromagnetic waves emitted from sensor 46. The spacing of the light beams, or other electromagnetic waves emitted from horizontal array sensor 46, may be varied, but in one embodiment, a beam of light may be emitted approximately every 5 millimeters along the length of sensor 46.

A release conveyor 52 is positioned at a downstream end of induction subsystem 24, Release conveyor 52 receives articles from induction conveyors 42 and delivers them to sortation subsystem 26. Zero, one, or more than one other conveyors, not shown, may be positioned between release conveyor 52 and sortation subsystem 26. A delivery conveyor 55 is positioned upstream of induction subsystem 24. Delivery conveyor 55 may be an accumulation conveyor adapted to accumulate articles with little or no spacing between the articles 28, or it may be another type of conveyor.

The upstream-most induct conveyor 42, which is labeled B1 in FIGS. 2 and 3, operates at a speed that may be a fixed or variable ratio of the speed of induct conveyor B2. Regardless of whether the ratio is fixed or variable, induct conveyor B2 operates at a higher speed than conveyor B1. This results in a gap being created, or enlarged, between articles 28 as they pass over the transition or interface 54 between induct conveyors B1 and B2. The creation or enlargement of the gap between articles 28 enables horizontal array sensors 46 to "see" between articles, thereby enabling sensor 46 to distinguish one article from another.

Each of the induct conveyors B2 through $B_N$ is controlled by an estimated time of arrival (ETA) gapper 80. Each ETA gapper 80 is part of a control 58 that controls the overall operation of induction subsystem 24. In one embodiment, control 58 include a microprocessor, microcontroller, or other type of electronic circuit capable of performing the calculations and control algorithms discussed herein, as would be known to one skilled in the art. In other embodiments, control 58 may include a plurality of such microprocessors, microcontrollers, or other types of electronic circuitry. Control 58 may be physically manifested inside of a programmable logic controller (PLC), or it may be physically manifested in other manners. In one embodiment, each of the ETA gappers 80 may be a software object within a program run by the one or more processors of control 58. In other embodiments, one or more of the ETA gappers 80 may include a dedicated processor, or processors, apart from the processor or processors of control 58.

Each ETA gapper 80 is associated with a particular induct conveyor B2, B3, $B_{N-1}$, $B_N$. Each ETA gapper 80 calculates what the speed of its associated induct conveyor 42 should be and then sends appropriate commands to a motor controller (not shown) that changes the speed of the associated motor controller to match the commanded speed. The type of motors and motor controller that may be used with induction subsystem 24 may vary, but in at least one embodiment, the motor and motor controllers may be a variable frequency drive and a controller adapted to control a variable frequency drive. Other types of motors and motor controllers may be used, and the construction of such motors and motor controllers are known in the art.

Each induct conveyor 42 is assigned a nominal speed that will, for purposes of description herein, be referred to as VN. The nominal speed VN of one induct conveyor 42 may vary from the nominal speed of another induct conveyor 42. In one embodiment, the nominal speed of an induct conveyor 42 will be higher than or equal to the nominal speed of its upstream neighboring induct conveyor 42. Thus, for example, in such an embodiment, the nominal speed VN of conveyor $B_N$ (abbreviated $VN_{BN}$) will be greater than or equal to $VN_{BN-1}$, and $VN_{BN-1} \geq VN_{BN-2}, \geq VN_{BN-3} \geq \ldots VN_{B1}$.

For purposes of facilitating description herein, the term "control article" will be used herein to refer to an article 28 that is currently located at a position with respect to its downstream, neighboring article 28 in which adjustments to the speed of the article can be made without impacting the downstream, neighboring article. For example, in FIG. 3, article A2 is a control article at the moment depicted because adjustments to the speed of conveyor B2 can be made that will not impact its downstream, neighboring article: article A3. In contrast, article A1 is not a control article at the moment depicted because any speed adjustments made to article A1 will also affect article A2 because both articles A1 and A2 are traveling on the same conveying surface 40 of conveyor B2. An article becomes a control article when its control region or control point is traveling on a particular conveyor 42 and its downstream neighbor article's control point or control region is not on the same particular conveyor 42. An article's control point or control region may be better understood with respect to FIG. 4.

Figure 4:
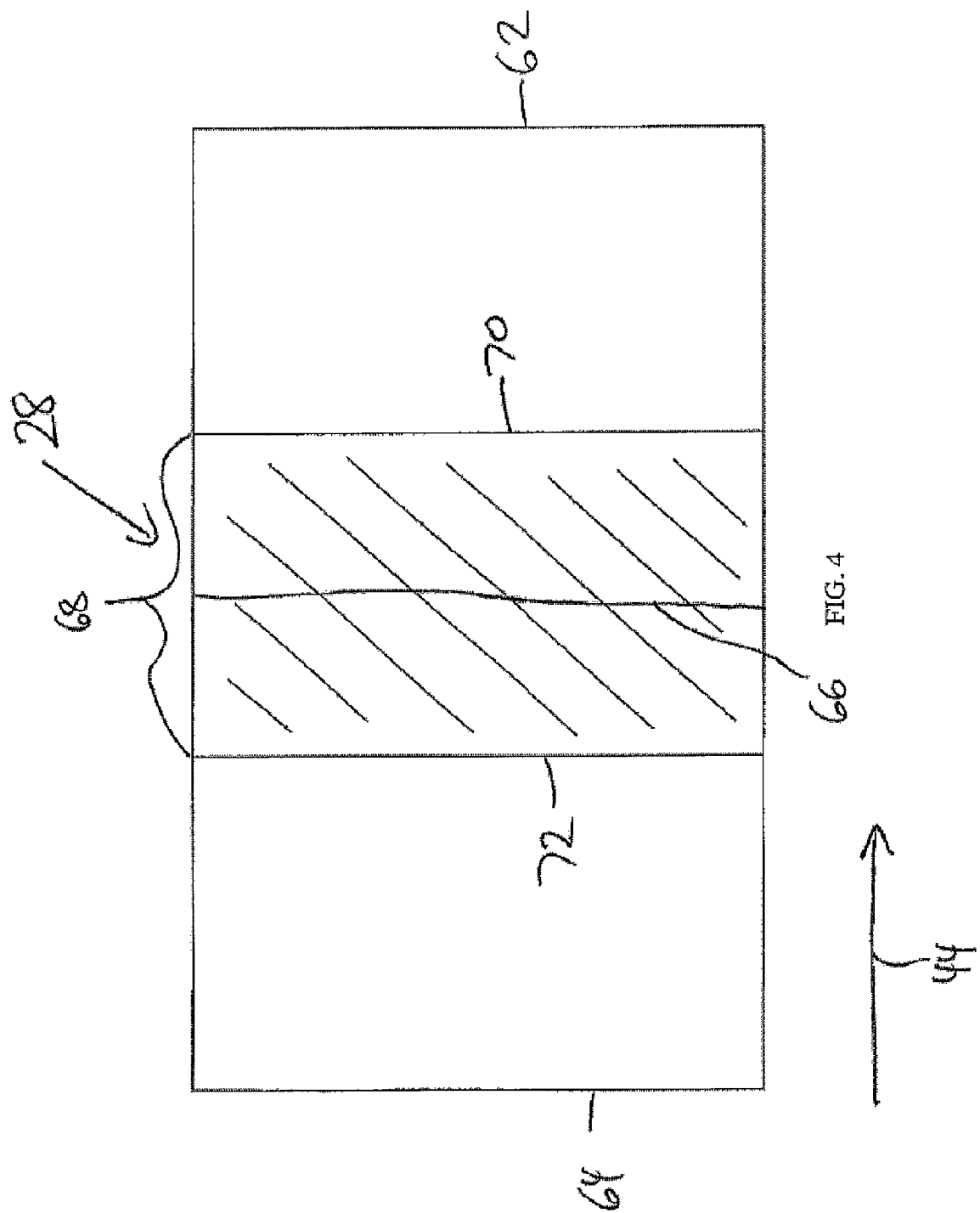
FIG. 4 is a plan view diagram of an article illustrating one possible example of a control region for the article.

FIG. 4 illustrates an article 28 having a leading edge 62, a trailing edge 64, a centerline 66, and a control region 68. Control region 68 includes a downstream edge 70 and an upstream edge 72. Control region 68 refers to the region of the article wherein the control of the speed of the article 28 will transition from one conveyor 42 to the downstream neighboring conveyor 42. That is, when an article 28 is traveling on a first conveyor and the leading edge 70 of the article's control region 68 reaches the center of the interface 54 between the first and second conveyors (with the second conveyor being immediately downstream of the first conveyor), the control of the article's speed may begin to be partially controlled by the second downstream conveyor, rather than solely by the first conveyor. Further, when the trailing edge 72 of the article's control region 68 reaches the center of the interface 54, the control of the article's speed should be completely in the hands of the downstream conveyor. Thus, leading and trailing edges 70 and 72 of the control region 68 represent the likely beginning and ending points when the control of an article's speed will transition from one conveyor to its downstream neighboring conveyor.

It will, of course, be understood by those skilled in the art that the particular reference point to which the control region 68 is associated may be varied from the center of the interface 54 between the two neighboring conveyors. That is, in some embodiments, it may be the alignment of downstream edge 70 of the articles' control region 68 with the upstream end of the downstream conveyor 42 that signifies that the article's speed is beginning to be controlled by the downstream conveyor 42. In such embodiments, the alignment of the upstream edge 72 of the control region 68 with the upstream end of the downstream conveyor would signify that control of the article's speed should have completely transitioned to the downstream conveyor. Other reference points besides the upstream end of the downstream conveyor and beside the midpoint of interface 54 may also be used for referencing the control region 68 or control point.

The size and location of control region 68 may be a variable that is configurable within a particular induction subsystem 24. That is, a particular induction subsystem 24 may be set up to assume that the control region 68 of all of the articles it processes is a particular size, such as, but not limited to, the middle 20% of the article. In other embodiments, the control region may be defined as the middle 30% of the article, or the middle 10%, or some other number. This number may be a variable that may be changeable by technicians, or other authorized personnel, to change the performance of induction subsystem 24.

In some embodiments, conveyor induction subsystem 24 may carry out its induction algorithms based upon a control point, rather than a control region 68. In at least one embodiment, centerline 66 of each article 28 may be treated as being the control point. That is, subsystem 24 may operate based upon the assumption that the speed of an article will change from the speed of a first conveyor it is presently on to the speed of its downstream neighboring conveyor substantially at the moment the centerline 66 of the article reaches the midpoint of the transition between the two conveyors. In still other embodiments, a subsystem may be included that actually determines a control point or control region for each article, rather than assuming a location and/or size of the control point or control region. One such subsystem capable of measuring these parameters is disclosed in commonly-assigned, U.S. Pat. No. 6,629,593 issued to Zeitler and entitled "Conveyor Induction System," the complete disclosure of which is hereby incorporated herein by reference.

It will, of course, be understood by those skilled in the art that the discussion herein of control points and control regions refers to definitions that are based upon the length of the article as projected along the dimension parallel to the direction of conveyance 44. Thus, for example, if square-shaped or rectangular-shaped articles are positioned on conveying surfaces 40 with a certain amount of rotation—i.e. the four sides of the article are not either precisely parallel or precisely perpendicular to direction of conveyance 44—the centerline 66 and control regions and/or control point will be determined based upon the length of the article 28 as projected along the direction of conveyance 44.

A release point 60 may be defined at the downstream end of induction subsystem 24. Release point 60 represents the point at which articles are released from induction subsystem 24. After passing by release point 60, articles 28 travel on release conveyor 52. Once the articles 28 are on release conveyor 52, control 58 no longer makes any adjustments to the gaps between the articles 28 on release conveyor 52. That is, once an article reaches release conveyor 52, control 58 no longer will make any adjustments to the size of the inter-article gap on the downstream side of the article that has just reached release conveyor 52. Indeed, in one embodiment, conveyor system 20 is set up such that, after articles 28 are released onto release conveyor 52, the system makes no further controlled adjustments to the gaps between articles 28 before feeding them to sortation subsystem 26. Stated alternatively, in one embodiment, induction system 24 is not a pre-gapping system, but rather carries out all the gapping adjustments that are desired before the articles reach the sortation subsystem.

In one embodiment, induction subsystem 24 operates wherein the control issue of interest is planning and achieving an optimal edge to edge distance between an article 28 and its adjacent, downstream article at the release point. That is, subsystem 24 operates such that it will attempt to deliver articles onto release conveyor 52 such that, once on release conveyor 52, the articles will have a desired gap 82 between themselves (FIG. 3). That is, the article will arrive on release conveyor 52 positioned behind its immediately downstream neighbor at a desired amount of distance therefrom. The desired amount of space may vary depending upon the length and/or width of a particular article 28, as well as the type of sortation subsystem 26, and/or other factors. For example, in some systems, it may be desirable to have a larger amount of space between relatively shorter articles than between relatively longer articles. Other variations in inter-article spacing may also be desirable. Horizontal array sensor 46, in one embodiment, detects the length of each article 28 and sends the detected length to control 58. Control 58 uses this information to determine a desired size of the gap between this article and its neighboring article when the articles reach release conveyor 52. This desired size may be based upon a table stored in electronic memory that correlates article lengths to desired sizes, or it may be determined using other means.

Regardless of whether induction subsystem 24 uses control points or control regions, or some combination thereof, and regardless of the manner in which such control points and/or control regions 68 are defined, induction subsystem 24 is configured, in one embodiment, such that each ETA gapper 80 will repetitively calculate and update a number of variables that are used in controlling the speed of the induct conveyor 42 associated with each ETA gapper 80. Such repetitive calculation may take place multiple times per second. The variables includes a NoAdjustETA variable, a PlannedReleaseTime variable, a CurrentDeltaETA variable, a CommandedSpeed variable, a MaxETAReduction variable, a MaxETAIncrease variable, and one or more other variables that are described herein. The definition of these variables and their use is described in greater detail below.

The NoAdjustETA variable is calculated by each ETA gapper 80 for each article 28 that is currently traveling on conveying surface 40 of the induct conveyor 42 associated with that particular ETA gapper 80. The NoAdjustETA variable is calculated for a particular article 28 based upon four factors; (1) a planned release time of the particular articles' downstream neighbor article, which will be discussed in greater detail below, (2) the current distance between the leading edge 70 the particular article's control, region 68 and the trailing edge 72 of the control region 68 of the downstream neighbor article, (3) the nominal speeds (VN) of each induct conveyor 42 between the particular article's current position and the release point 60, including the nominal speed of the induct conveyor 42 on which the particular article is currently positioned; and (4) the length of each downstream induct conveyor 42.

Each ETA gapper 80 also repetitively calculates a MaxETAReduction variable and a MaxETAIncrease variable for each article 28 on the conveying surface 40 associated with that particular ETA gapper 80. The MaxETAReduction variable generally indicates the maximum amount of time that the estimated time of arrival (ETA) for the article can be delayed without also delaying the arrival time of the downstream neighboring article at release point 60. The MaxETAIncrease variable generally indicates the maximum amount of time that the ETA for the article can be increased without also increasing the arrival time of the downstream neighboring article at release point 60. Each of these two variables is calculated based on the following three factors: (1) the operating velocity limits of the conveying surfaces 40, which may be belts; (2) the current position—relative to release point 60—of the article for which the variables are being calculated; and (3) the distance between the leading edge 70 of the article's control region and the trailing edge 72 of the control region of the downstream neighboring article.

Each ETA gapper 80 also calculates a variable that, for purposes of discussion, is referred to as a PlannedReleaseTime variable. The PlannedReleaseTime variable is calculated based upon the NoAdjustETA variable, the MaxETAReduction variable, the MaxETAIncrease variable, and the desired release time. The desired release time (DRT) is calculated based upon the desired size of the gap 82 (FIG. 3) between articles as they travel on release conveyor 52. As was noted, the desired size of gap 82 may be a fixed distance for all articles, may be based upon the length and/or width of the articles, may be based upon the particular needs of sortation subsystem 26, and/or may be based upon other variables. In one embodiment, control 58 has access to a table stored in an accessible memory that dictates the desired gap size 82 for each article. The table may be based upon any one or more of the factors just mentioned.

Each ETA gapper 80 calculates the desired release time (DRT) for each article based upon the desired gap size 82. The DRT is calculated for a particular article by taking the PlannedReleaseTime of the article's downstream neighbor and adding the amount of time necessary for release conveyor 52 to travel a distance equal to the desired gap size 82. Thus, control 58 is in communication with one or more speed sensors, such as, but not limited to, a pulse position indicator (PPI) 78 (FIGS. 2 & 3), that tell it what the current speed of release conveyor 52 is, which may be constant in at least one embodiment. If an article has no downstream neighboring article, such as the first article to enter induction subsystem 24 after the previously processed articles have cleared subsystem 24, the DRT is calculated for that first article by setting it equal to the estimated time it would take for the article to traverse the entire set of induction conveyors 42 at their respective nominal speeds and arrive at release point 60. The DRT for the subsequent articles would then be calculated in the manner described above.

The PlannedReleaseTime for an article that enters inductions subsystem 24 with no neighboring downstream article is initially set equal to the DRT. Thereafter, the PlannedReleaseTime for that article is adjusted only to the extent any speed deviations necessary for induct subsystem 24 to make in order to deliver the article to release point 60 at the DRT exceed either the MaxETAReduction or MaxETAIncrease variables. For subsequent articles, the PlannedReleaseTime is also adjusted in a similar manner; that is, the PlannedReleaseTime variable is adjusted if, given the constraints of the MaxETAReduction and MaxETAIncrease variables, induction subsystem 24 will not be able to deliver an article to release point 60 at the DRT. In such cases, the PlannedReleaseTime is adjusted to be equal to the time closest to the DRT that subsystem 24 will be able to achieve, given the constraints of the MaxETAReduction and MaxETAIncrease variables.

In the following discussion, the term "control article" will refer to the article on a particular conveying surface 40 whose control region 68 is fully traveling on the conveying surface 40 and whose downstream neighboring article does not have any of its control region 68 on that same conveying surface 40. In the example of FIG. 3, article A2 is the control article on induct conveyor B2; article A4 is the control article on conveyor B3, and article A5 is likely the control article on conveyor $B_{N-1}$, depending upon the exact dimensions of the control region 68 of article A6 and the interface 54 between conveyors $B_{N-1}$ and $B_N$.

Each ETA gapper 80 attempts to adjust the speed of its associated conveying surface 40 such that the control article will reach the discharge point of that particular conveying surface 40 at the article's PlannedReleaseTime minus the time required for the article to travel from the discharge point to release point 60 at the nominal speed(s) of any and all conveying surfaces between that particular conveying surface 40 and release conveyor 52. The discharge point refers to the point at which the article is said to be discharged from a particular conveying surface 40. If control regions are being used, then the discharge point would be the point at which the leading edge 70 of the article's control region 68 reached the midpoint of the interface 54 between the two adjacent conveying surfaces 40. If control points are being used, then the discharge point would be the point at which the control point of the article reached the midpoint of the interface 54 between the two adjacent conveying surfaces.

Each ETA gapper 80 repetitively makes speed adjustments to its associated conveying surface 40 based upon feedback provided by horizontal array sensor 46. Feedback from other sensors, such as speed sensors, may also be utilized by each ETA gapper 80. Alternatively, the speed of conveying surfaces 40 may be determined from feedback provided by the motor controllers that control the motors of induct conveyors 42, or by feedback provided by sensor 46, or by other feedback. In one embodiment, each ETA gapper 80 may compute a CurrentDeltaETA for each article that is equal to that article's PlannedReleaseTime minus that article's NoAdjustETA. From the CurrentDeltaETA variable, a speed command may be generated. In one embodiment, the speed command may be referred to as "CommandedSpeed" and the CommandedSpeed variable may be calculated as follows:

CommandedSpeed=VN−(K*CurrentDeltaETA/VN), where VN equals the nominal speed of the particular conveying surface 40 on which the article is currently traveling.

Each MaxETAReduction and MaxETAIncrease variable is updated based on the current commanded speed of the corresponding article and the article's current distance from release point 60. The maximum values will typically decrease as the article progresses along induction subsystem 24 if the maximum possible adjustment has not been implemented.

As articles travel over conveying surfaces 40, they are tracked based on the commanded speed of their corresponding surfaces 40 and by horizontal array sensor 46, Each ETA gapper 80 periodically updates its speed control of its associated conveying surface 40 based on updated measurements from article sensor 46. These updates proceed from downstream to upstream so that modifications to the PlannedReleaseTime of a downstream article can be accommodated in the PlannedReleaseTime of the upstream articles.

In one embodiment, control 58 may be configured such that, if the conveying surface 40 immediately downstream of a control article is currently unoccupied, control 58 may control the speed of the unoccupied conveying surface to match the speed of the conveying surface on which the control article is traveling. This relaxes the constraints on the speed of the conveying surface 40 currently occupied during the article's transition to the neighboring downstream conveying surface 40. In other words, the conveying surface 40 no longer has to be sped up or slowed down as sharply in order to substantially match the downstream surface 40's speed during the article's transition thereto because the downstream conveying surface 40 can be more closely matched to the upstream conveying surface 40.

As was alluded to above, each ETA gapper 80 performs the calculations described above multiple times a second, such as, but not limited to, once every 10-20 milliseconds. Each calculation of these variables takes into account the changes that have occurred in the article's positions relative to each other and relative to the induct conveyors 42 that have occurred since the previous set of calculations were completed. In this manner, repetitive feedback is provided via horizontal array sensor 46 and/or other sensors. Such other sensors may include speed sensors that determine the speed of each induct conveyor 42, as well as release conveyor 52. Alternatively, the speed of each conveyor may be computed based upon the speed at which articles traveling on that conveyor are detected by horizontal array sensor 46.

While induction subsystem 24 has been described herein as comprising a single series of sequentially arranged induct conveyors 42, it will be understood by those skilled in the art that the principles described herein could be applied to multi-line induction subsystems. That is, the principles described herein may be applied to induction subsystems that create desired gaps between articles on two or more separate conveyor lines that are then merged together onto a single line with the desired gapping between the articles. The construction of such a multi-line inductions subsystem may utilize a merge synchronization algorithm that evaluates the earliest MaxETAReduction and the latest MaxETAIncrease achievable release time for all articles and then determines an optimal article release sequence based thereon. A PlannedReleaseTime would then be assigned to each article.

It will also be understood by those skilled in the art that induct subsystem 24 may be modified in other manners. For example, induct subsystem 24 could be modified such that only a plurality of induct conveyors 42 followed the ETA calculation algorithms described herein. Stated alternatively, induct subsystem 24 could be modified such that some interfaces 54 between induct conveyors 42 did not include an ETA gapper 80. Such interfaces 54 might include a gapper, or other structure, that followed some other control algorithm. Such a control algorithm may be a ratio control algorithm, as described in greater detail below, or it could be a different type of control algorithm. Induct subsystem 24 could therefore, in some embodiments, include a combination of different types of induct control algorithms within the same subsystem 24. In still other embodiments, each interface 54 between conveyors 42 could be controlled by the same type of control algorithm. Other modifications are also possible.

Figure 5:
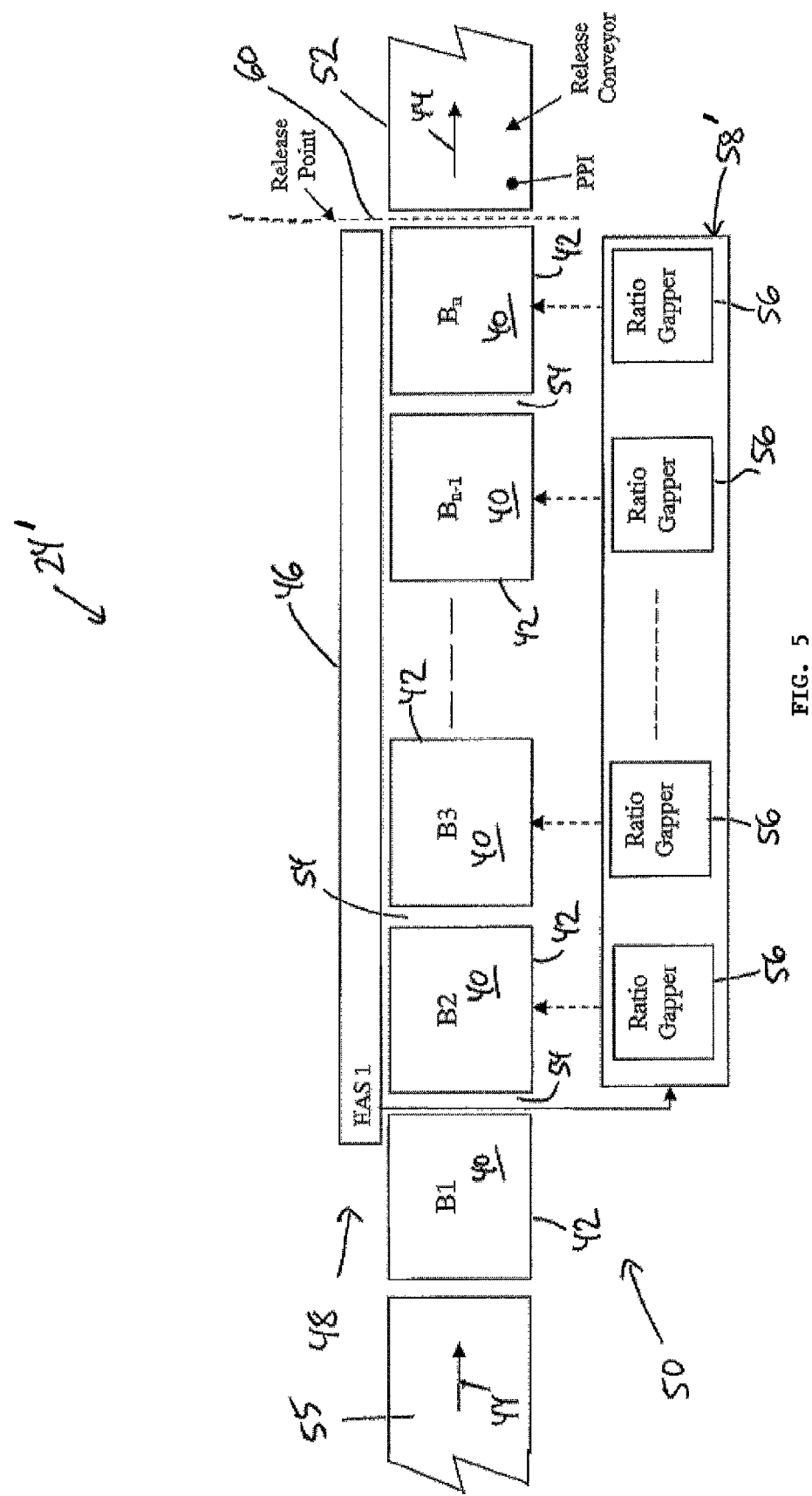
FIG. 5 is a plan view diagram of a conveyor induct subsystem according to an alternative embodiment.
Figure 6:
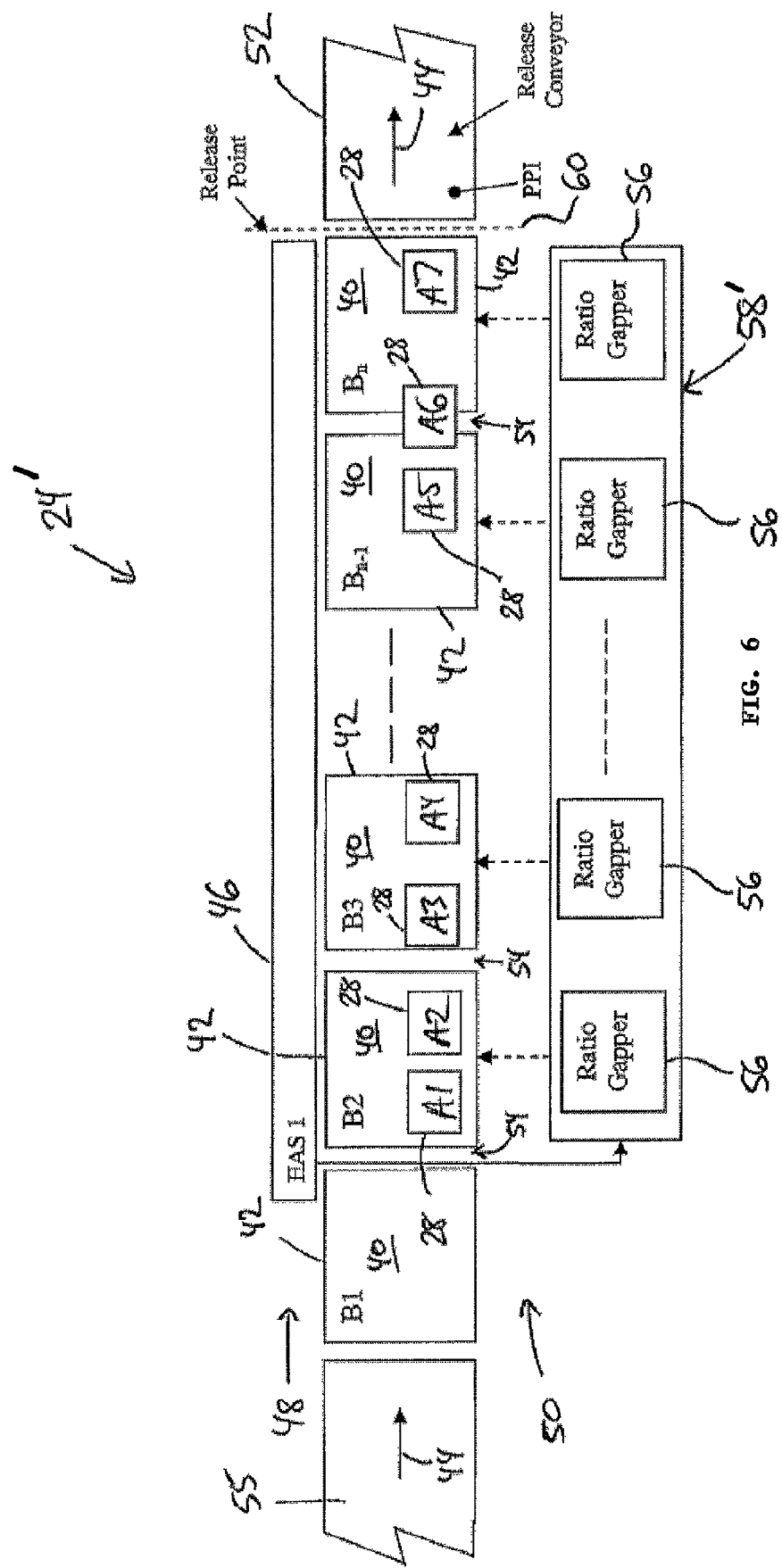
FIG. 6 is a plan view diagram of the conveyor induct subsystem of FIG. 5 shown with an arbitrary arrangement of articles positioned on various of the conveying surfaces.

FIGS. 5-6 illustrate an alternative embodiment of an induction subsystem 24'. Induct subsystem 24' includes many components that are common to induct subsystem 24. Such common components have been identified herein with the same reference numbers. Such common components operate in the same manner as has been described, unless described to the contrary, and therefore further detailed description of them is not necessary. One difference between induct subsystem 24 and induct subsystem 24' is that the ETA gappers 80 of subsystem 24 have been replaced by ratio gappers 56. Further description of subsystem 24' is provided below.

The upstream-most induct conveyor 42, which is labeled B1 in FIGS. 5 and 6, operates at a speed that may be a fixed or variable ratio of the speed of induct conveyor B2. Regardless of whether the ratio is fixed or variable, induct conveyor B2 operates at a higher speed than conveyor B1. This results in a gap being created, or enlarged, between articles 28 as they pass over the transition or interface 54 between induct conveyors B1 and B2. The creation or enlargement of the gap between articles 28 enables horizontal array sensors 46 to "see" between articles, thereby enabling sensor 46 to distinguish one article from another.

Each of the induct conveyors B2 through $B_N$ is controlled by a ratio gapper 56. Each ratio gapper 56 is part of a control 58' that controls the overall operation of induction subsystem 24'. In one embodiment, control 58' include a microprocessor, microcontroller, or other type of electronic circuit capable of performing the calculations and control algorithms discussed herein, as would be known to one skilled in the art. In other embodiments, control 58' may include a plurality of such microprocessors, microcontrollers, or other types of electronic circuitry. Control 58' may be physically manifested inside of a programmable logic controller (PLC), or it may be physically manifested in other manners. In one embodiment, each of the ratio gapers 56 may be a software object within a program run by the one or more processors of control 58'. In other embodiments, one or more of the ratio gapers 56 may include a dedicated processor, or processors, apart from the processor or processors of control 56.

Each ratio gapper 56 is associated with a particular induct conveyor B2, B3, $B_{N-1}$, $B_N$. Each ratio gapper 56 calculates what the speed of its associated induct conveyor 42 should be and then sends appropriate commands to a motor controller (not shown) that changes the speed of the associated motor controller to match the commanded speed. The type of motors and motor controller that may be used with induction subsystem 24' may vary, but in at least one embodiment, the motor and motor controllers may be a variable frequency drive and a controller adapted to control a variable frequency drive. Other types of motors and motor controllers may be used, and the construction of such motors and motor controllers are known in the art.

Each induct conveyor 42 is assigned a nominal speed that will, for purposes of description herein, be referred to as VN. The nominal speed VN of one induct conveyor 42 may vary from the nominal speed of another induct conveyor 42. In one embodiment, the nominal speed of an induct conveyor 42 will be higher than the nominal speed of its upstream neighboring induct conveyor 42. Thus, for example, in such an embodiment, the nominal speed VN of pre-release conveyor $B_N$ (abbreviated $VN_{BN}$) will be greater than $VN_{BN-1}$, and $VN_{BN-1} > VN_{BN-2}, > VN_{BN-3} > \ldots VN_{B1}$. In other embodiments, it may be suitable to set one or more of the ratios of the adjacent conveyor speeds equal to one. For example, in another embodiment, $VN_{BN}$ may be set to operate at the same speed as the speed of release conveyor 52, i.e. the ratio of their speeds may be equal to one.

Each ratio gapper 56 calculates a variable that, for purposes of discussion herein, will be called an Applied Speed. The Applied Speed is the speed that the ratio gapper 56 commands the motor controller associated with each induction conveyor 42 to operate at. The calculation of the Applied Speed in one embodiment will be described below in greater detail, but generally speaking each ratio gapper 56 determines a speed for its associated induct conveyor 42 based upon a desired speed ratio between the associated induct conveyor 42 and its downstream neighboring induct conveyor 42 (or release conveyor, for pre-release conveyor $B_N$). Thus, for example, the ratio gapper 56 for conveyor B2 will compute a speed ratio between the speed of conveyor B2 and its downstream neighbor, conveyor B3. Ratio gapper 56 will then send a command to the motor controller for conveyor B2 causing conveyor B2 to operate at the commanded speed. The computed speed ratio will be computed repetitively, multiple times a second, and a new speed command will likewise be computed and sent to the motor controller for conveyor B2 repetitively, multiple times a second. This repetitive calculation of the ratio and speed commands enables the speed of conveyor B2 to be adjusted in order to maintain the desired ratio between conveyors B2 and B3, as well as to make any necessary adjustments in the desired ratio between these two conveyors.

In a like manner, the downstream ratio gapper 56 will compute a desired ratio between the speed of its associated induct conveyor 42, in this case conveyor B3, and its neighboring downstream conveyor (e.g. B4). This desired ratio will be repetitively computed and corresponding commands will be repetitively sent to the motor controller for conveyor B3. Overall, each induct conveyor B2, B3, $B_{N-1}$, $B_N$ will have its speed determined by an associated ratio gapper 56 that will make the speed determination based upon a desired speed ratio between that particular ratio gapper's induct conveyor 42 and the speed of its downstream neighboring induct conveyor 42 (or release conveyor 52 in the case of the ratio gapper for conveyor $B_N$). The speed of conveyor B1 may be set at a constant ratio with respect to the speed of conveyor B2, and a separate ratio gapper 56 for conveyor B1 may therefore be omitted. Alternatively, a ratio gapper could be included for conveyor B1 and its speed ratio with respect to conveyor B2 may be varied. In such a case, it may be desirable to extend array sensor 46 further upstream in order for the sensor 46 to be able to detect the movement of articles on a larger portion of the conveying surface 40 of conveyor B1.

A release point 60 may be defined at the downstream end of induction subsystem 24'. Release point 60 represents the point at which articles are released from induction subsystem 24'. After passing by release point 60, articles 28 travel on release conveyor 52. Once the articles 28 are on release conveyor 52, control 58' no longer makes any adjustments to the gaps between the articles 28 on release conveyor 52. That is, once an article reaches release conveyor 52, control 58' no longer will make any adjustments to the size of the inter-article gap on the downstream side of the article that has just reached release conveyor 52. Indeed, in one embodiment, conveyor system 20 is set up such that, after articles 28 are released onto release conveyor 52, the system makes no further controlled adjustments to the gaps between articles 28 before feeding them to sortation subsystem 26. Stated alternatively, in one embodiment, induction system 24' is not a pre-gapping system, but rather carries out all the gapping adjustments that are desired before the articles reach the sortation subsystem.

In one embodiment, induction subsystem 24' operates wherein the control issue of interest is planning and achieving an optimal edge to edge distance between an article 28 and its adjacent, downstream article at the release point. That is, subsystem 24' operates such that it will attempt to deliver articles onto release conveyor 52 such that, once on release conveyor 52, the articles will have the desired amount of space between themselves. The desired amount of space may vary, depending upon the length of a particular article 28, as well as the type of sortation subsystem 26, and/or other factors. For example, in some systems, it may be desirable to have a larger amount of space between relatively shorter articles than between relatively longer articles. Other variations in inter-article spacing may also be desirable. Horizontal array sensor 46, in one embodiment, detects the length of each article 28 and sends the detected length to control 58'. Control 58' uses this information to determine a desired size of the gap between this article and its neighboring article when the articles reach release conveyor 52. This desired size may be based upon a table stored in electronic memory that correlates article lengths to desired sizes, or it may be determined using other means.

As with induct subsystem 24, the size and location of control region 68 of articles 28 in induct subsystem 24' may be a variable that is configurable within a particular induction subsystem installation. That is, a particular induction subsystem 24' may be set up to assume that the control region 68 of all of the articles it processes is a particular size, such as, but not limited to, the middle 20% of the article. In other embodiments, the control region may be defined as the middle 30% of the article, or the middle 10%, or some other number. This number may be a variable that may be changeable by technicians, or other authorized personnel, to change the performance of induction subsystem 24'.

In some embodiments, conveyor induction subsystem 24' may carry out its induction algorithms based upon the centerline 66 being the control point. That is, subsystem 24' may operate based upon the assumption that the speed of an article will change from the speed of a first conveyor it is presently on to the speed of its downstream neighboring conveyor at the moment the centerline of the article reached the midpoint of the transition between the two conveyors. In still other embodiments, a subsystem may be included that actually determines a control point or control region for each article, rather than assuming a location and/or size of the control point or control region. One such subsystem capable of measuring these parameters is disclosed in commonly-assigned, U.S. Pat. No. 6,629,593 issued to Zeitler and entitled "Conveyor Induction System," the complete disclosure of which is hereby incorporated herein by reference.

Regardless of the manner in which control points and/or control regions 68 are defined, induction subsystem 24' is configured, in one embodiment, such that each ratio gapper 56 will calculate a speed ratio for its associated conveyor 42 relative to its downstream neighbor that will cause the article to arrive at the release point 60 with the correct centerline to centerline distance between that article and its downstream neighbor on release conveyor 52. In carrying out this control, each ratio gapper 56 computes a variable named, for purposes of description herein, a FinalCenterline Target. The FinalCenterline Target distance is calculated for each control article and its downstream neighboring article based on the final, desired gap between that control article and its downstream neighbor on the release conveyor 52. Each ratio gapper 56 also computes a LocalCenterline Target for each control article. The LocalCenterline Target represents the desired centerline gap between the control article and its downstream neighbor when the control article exits the induct conveyor 42 it is currently traveling on. This desired centerline gap is calculated using all of the nominal speeds of the downstream induct conveyors 42. That is, the LocalCenterline Target calculation will take into account the anticipated nominal speeds of the downstream conveyors 42, and the anticipated size of the gaps that will be created across the respective conveying surface interfaces 54. The LocalCenterline Target will therefore represent the desired gapping between the control article and its downstream article that would result in the FinalCenterline Target being achieved were all of the downstream induct conveyors 42 to operate at their nominal speeds.

Each ratio gapper 56 of induct subsystem 24' may also compute a variable referred to for purposes of description herein as an IdealRatio. The IdealRatio variable for a given induct conveyor 42 is calculated as the CurrentCenterline variable divided by the LocalCenterline Target. The CurrentCenterline variable is the distance between the centerline of the control article and the centerline of its downstream neighbor, if a control point equal to the centerline of the articles is being used. If, instead of a control point, a control region is being used, the CurrentCenterline variable is the distance between the leading edge 70 of the control article's control region and the trailing edge 72 of the downstream neighbor article's control region. Regardless of whether a control point or control region is used, the CurrentCenterline variable is calculated with the assistance of horizontal array sensor 46, which measures the length of each article and the relative position of each article.

Each ratio gapper also calculates a variable referred to as, for purposes of description herein, an EffectivenessFactor. The EffectivenessFactor is calculate as the AvailableDistance divided by the CurrentCenterline variable. The AvailableDistance variable may be determined with the assistance of the horizontal array sensor 46. If control points are being used by induction subsystem 24', rather than control regions, the AvailableDistance refers to the distance between the centerline 66 of the control article and the downstream end of the induct conveyor 42 that the article is currently traveling on. If control regions are being used instead of control points, the AvailableDistance refers to the distance between the leading edge 70 of the control region and the downstream end of the induct conveyor 42 that the article is currently traveling on.

Each ratio gapper 56 further calculates a variable referred to as, for purposes of description herein, a RatioDifferential. The RatioDifferential is calculated as follows:

$$\text{RatioDifferential} = (1 - \text{IdealRatio}) / \text{EffectivenessFactor}$$

Each ratio gapper 56 further calculates a variable referred to as, for purposes of description herein, an AppliedRatio. The AppliedRatio is calculated as follows:

$$\text{AppliedRatio} = 1 - \text{RatioDifferential}.$$

The AppliedRatio may then be used to compute the speed of the induct conveyor 42 controlled by the particular ratio gapper 56. That is, each ratio gapper 56 is made aware of the current speed of the downstream neighboring conveyor.

Armed with that knowledge, each ratio gapper 56 may use the AppliedRatio and the known speed of its downstream neighboring conveyor to calculate a speed for its associated conveyor 42 that will have a value that fulfills the AppliedRatio. In other words, for example, if the downstream conveyor is traveling at a speed of 200 units per minute and the calculated value of the AppliedRatio variable is 0.9, then the associated ratio gapper 56 will issue a speed command to its associated induct conveyor 42 that will attempt to cause that induct conveyor 42 to operate at a speed of 180 units per minute (200*0.9=180).

In some embodiments, each ratio gapper 56 may adjust the AppliedRatio value prior to generating a speed command for the associated induct conveyor 42. Such adjustments to the AppliedRatio may involve limiting the AppliedRatio such that the associated induct conveyor 42 doesn't exceed a maximum speed, or limiting the ratio of the speeds between the induct conveyor 42 and its downstream neighbor, or limiting the maximum difference in speed—in absolute terms—between the associated induct conveyor 42 and its downstream neighbor, or other limiting the AppliedRatio in other ways. The reasons for such limitations may vary, but may involve, as but some examples, constraints applicable to the conveyor's motors, safety constraints, constraints that are dependent upon the particular articles being transported, etc.

As was alluded to above, each ratio gapper 56 performs the calculations described above multiple times a second, such as, but not limited to, once every 10-20 milliseconds. Each calculation of these variables takes into account the changes that have occurred in the article's positions relative to each other and relative to the induct conveyors 42 that have occurred since the previous set of calculations were completed. In this manner, repetitive feedback is provided via horizontal array sensor 46 and/or other sensors. Such other sensors may include speed sensors that determine the speed of each induct conveyor 42, as well as release conveyor 52. Alternatively, the speed of each conveyor may be computed based upon the speed at which articles traveling on that conveyor are detected by horizontal array sensor 46.

In other embodiments, each ratio gapper may be configured to calculate an AppliedRatio factor for each article on its respective induct conveyor 42, rather than only for the control article. The ratio gapper 56 may then choose the smallest one of the calculated AppliedRatio variables and use that variable for setting the speed of the associated induct conveyor. Limits may also be applied to this smallest AppliedRatio variable. This configuration allows the system to "look upstream" and generally improves the ability of the induction subsystem to separate small articles 28 and to generate larger gaps between articles.

Induction subsystem 24' adjusts the ratio of speeds between adjacent conveyors, as has been described herein, in order to achieve a final, desired gap between articles. The final desired gap between articles refers to the distance between the leading edge 62 of an article and the trailing edge 64 of its downstream neighboring article.

While induction subsystem 24' has been described herein as comprising a single series of sequentially arranged induct conveyors 42, it will be understood by those skilled in the art that the principles described herein could be applied to multi-line induction subsystems. That is, the principles described herein may be applied to induction subsystems that create desired gaps between articles on two or more separate conveyor lines that are then merged together onto a single line with the desired gapping between the articles.

It will also be understood by those skilled in the art that induct subsystem 24' may be modified in other manners. For example, induct subsystem 24' could be modified such that only a plurality of induct conveyors 42 followed the ratio calculation algorithms described herein. Stated alternatively, induct subsystem 24' could be modified such that some interfaces 54 between induct conveyors 42 did not include a ratio gapper 56. Such interfaces 54 might include a gapper, or other structure, that followed some other control algorithm. Such a control algorithm may be an ETA control algorithm, as described above, or it could be a different type of control algorithm. Induct subsystem 24' could therefore, in some embodiments, include a combination of different types of induct control algorithms within the same subsystem 24'. In still other embodiments, each interface 54 between conveyors 42 could be controlled by the same type of control algorithm. Other modifications are also possible.

Changes and modifications in the specifically described embodiments can be carried out without departing from the principles of the invention which is intended to be limited only by the scope of the appended claims, as interpreted according to the principles of patent law including the doctrine of equivalents.

What is claimed is:

1. A conveyor induct system comprising:
    a plurality of sequentially arranged conveying surfaces positioned upstream of a release location;
    at least one article sensor adjacent to at least one of said conveying surfaces; and
    a control that produces controlled edge-to-edge gaps between articles at the release location, said control adapted to define a plurality of ratio-gappers, said ratio-gappers responsive to said at least one article sensor to control speeds of at least some of said conveying surfaces, said ratio-gappers adapted to use said at least one article sensor to determine a distance between a downstream edge of a control region of a first article on one of said conveying surfaces and an upstream edge of a control region of a second article on an adjacent one of said conveying surfaces downstream of said one of said conveying surfaces, wherein the control region is a surface portion of an article that will influence movement of that article when contacted by one of adjacent said conveying surfaces, said ratio-gappers further adapted to determine an available distance between the control region of one of the first and second articles and the release location, each of said ratio-gappers adapted to control a speed of one of said conveying surfaces as a speed ratio relative to a speed of the adjacent downstream one of said conveying surfaces, each of the speed ratios being based at least partially upon the relative distance between the downstream edge of the control region of the first article and the upstream edge of the control region of the second article and the available distance of the control region of one of the first and second articles from the release location.

2. The system of claim 1 wherein said control adjusts each of said speed ratios based at least partially upon the speed ratio of a pair of conveying surfaces downstream of said first and second conveying surfaces.

3. The system of claim 1 wherein said induct system includes a downstream-most conveying surface that delivers articles to a release conveyor at the release location, said control controlling a speed of said downstream-most conveying surface at a desired ratio with respect to a speed of the release conveyor.

4. The system of claim 3 wherein said conveyor induct system makes no changes to gaps between articles after the articles are positioned on said release conveyor.

5. The system of claim 1 wherein said at least one article sensor includes at least one horizontal array of electromagnetic wave emitters positioned on one side of said plurality of sequentially arranged conveying surfaces and at least one horizontal array of electromagnetic wave detectors positioned on an opposite side of said plurality of sequentially arranged conveying surfaces.

6. The conveyor induct system of claim 1
wherein said control further defining at least one estimated time of arrival gapper with respect to one of said conveying surfaces, said at least one estimated time of arrival gapper adapted to use said at least one article sensor to determine an estimated time of arrival of an article on that one of said conveying surfaces at the release location, said control using said at least one estimated time of arrival gapper to make adjustments to a speed of that one of said conveying surfaces in order to facilitate arrival of an article on that one of said conveying surfaces at said release location at a desired time of arrival of that article.

7. The system of claim 6 wherein said at least one estimated time of arrival gapper determines the desired time based at least partially upon a planned arrival time of a neighboring article positioned downstream of that article.

8. The system of claim 6 further including at least one intermediate conveying surface positioned downstream of that one conveying surfaces and upstream of said release location.

9. The system of claim 8 including a pre-release conveying surface positioned adjacent to, and upstream of, said release location, wherein said at least one estimated time of arrival gapper determines the desired time of arrival of that article based at least partially upon a nominal speed of said pre-release conveying surface.

10. The system of claim 6 wherein said at least one estimated time of arrival gapper is further adapted to determine if a downstream conveying surface immediately downstream of that one of said conveying surfaces is unoccupied and, if said downstream conveying surface is unoccupied, said control is adapted to control a speed of said downstream conveying surface such that said speed of said downstream conveying surface matches a speed of that one of said conveying surfaces.

11. The system of claim 6 wherein each one of said plurality of conveying surfaces has a nominal speed value associated with it and said control uses the nominal speed value in determining an estimated time of arrival.

12. The system of claim 11 wherein the nominal speed value of each conveying surface is greater than or equal to the nominal speed of any neighboring conveying surface located upstream thereof.

13. The system of claim 11 wherein said estimated time of arrival gapper is further adapted to control a speed of that one of said conveying surfaces such that the article exits that one of said conveying surfaces at a planned release time, the planned release time preceding the estimated time of arrival of that article by an amount of time required for that article to travel from a downstream end of the upstream conveying surface to the release location at nominal speed.

14. The system of claim 6 wherein said plurality of conveying surfaces further includes at least four conveying surfaces positioned downstream of that one of said conveying surfaces and upstream of said pre-release conveying surface.

15. A conveyor system comprising:
a merge subsystem;
a sortation subsystem;
an induct subsystem downstream of said merge subsystem and upstream of said sortation subsystem, said induct subsystem adapted to feed articles to said sortation subsystem, said induct subsystem comprising:
(i) a plurality of sequentially arranged conveying surfaces, said plurality of conveying surfaces including a downstream-most conveying surface that delivers articles to a release conveyor;
(ii) at least one article sensor adjacent to at least one of said plurality of conveying surfaces; and
(iii) a control that produces controlled edge-to-edge gaps between articles at said release conveyor, said control adapted to define a plurality of ratio-gappers, said ratio-gappers responsive to said at least one article sensor to control speeds of at least some of said conveying surfaces, said ratio-gappers adapted to use said at least one article sensor to determine a distance between a downstream edge of a control region of a first article on one of said conveying surfaces and an upstream edge of a control region of a second article on an adjacent one of said conveying surfaces downstream of said one of said conveying surfaces wherein the control region is a surface portion of an article that will influence movement of that article when contacted by one of adjacent said conveying surfaces, said ratio-gappers adapted to determine an available distance between the control region of at least one of the articles and a release location at said release conveyor, each of said ratio-gappers adapted to control a speed of one of said conveying surfaces as a speed ratio relative to a speed of the adjacent downstream one of said conveying surfaces, each of the speed ratios being based at least partially upon the distance between the downstream edge of the control region of the first article and the upstream edge of a control region of the second article and the available distance of the control region of one of the first and second articles from the release location, said control further adapted to control a speed of said downstream-most conveying surface at a constant ratio with respect to a speed of the release conveyor.

16. The system of claim 15 wherein the constant ratio is calculated in order to adjust a gap between an article traveling on said downstream-most conveying surface and an article traveling on said release conveyor.

17. The system of claim 15 wherein said plurality of conveying surfaces further includes first and second conveying surfaces upstream of said downstream-most conveying surface, and one of said ratio-gappers is adapted to use said at least one article sensor to determine a distance between a downstream edge of a control region of a first article and an upstream edge of a control region of a second article, said second article positioned downstream of said first article, said control further adapted to control a ratio of a speed of the first conveying surface to a speed of the second conveying surface based at least partially upon the distance between the downstream edge of a control region of the first article and the upstream edge of a control region of the second article.

18. A conveyor induct system comprising:
a plurality of sequentially arranged conveying surfaces, said plurality of sequentially arranged conveying surfaces including at least a first conveying surface, at least a second conveying surface, at least a third conveying surface, and at least a downstream-most conveying surface that delivers articles to a release conveyor;
at least one article sensor adjacent to at least one of said plurality of conveying surfaces; and a control that produces controlled edge-to-edge gaps between articles at said release conveyor, the control adapted to define a plurality of ratio-gappers, each responsive to said at least one article sensor, a first of said ratio-gappers adapted to control a first ratio of a speed of the first conveying surface relative to a speed of the second conveying surface, a second of said ratio-gappers adapted to control a second ratio of the speed of the second conveying surface relative to a speed of the third conveying surface, and a third of said ratio-gappers adapted to control a third ratio of a speed of the downstream-most conveying surface relative to a speed of the release conveyor, said first ratio-gapper further adjusting said first ratio based at least partially upon a distance between a downstream edge of a control region of a first article on one of said conveying surfaces and an upstream edge of a control region of a second article on an adjacent one of said conveying surfaces downstream of said one of said conveying surfaces, and at least partially upon at least one speed ratio of one of said ratio-gappers between conveying surfaces positioned downstream of said second conveying surface, wherein the control region is a surface portion of an article that will influence movement of that article when contacted by one of adjacent said conveying surfaces and said conveyor induct system making no changes to gaps between articles after the articles are positioned on said release conveyor.

19. The system of claim 18 wherein said control regions of said first and second articles being centerlines of said first and second articles, wherein the first and second ratios are both calculated based at least partially upon distance between the centerlines of the first and second articles traveling through said induct subsystem.

20. A method of inducting articles using a plurality of sequentially arranged conveying surfaces including a downstream-most conveying surface that delivers articles to a release conveyor and at least one article sensor adjacent to at least one of said plurality of conveying surfaces, in order to achieve a controlled gap between leading and trailing edges of articles at the release conveyor, said method comprising:
defining a plurality of ratio-gappers;
controlling speeds of at least some of said conveying surfaces with said ratio-gappers in response to said at least one article sensor;
determining with said at lest one article sensor a distance between a downstream edge of a control region of a first article on one of said conveying surfaces and an upstream edge of a control region of a second article on an adjacent one of said conveying surfaces downstream of said one of said conveying surfaces article and an available distance between the control region of at least one of the articles and a release location at said release conveyor, wherein the control region is a surface portion of an article that will influence movement of that article when contacted by one of adjacent said conveying surfaces; and
controlling a speed of one of said conveying surfaces with one of said ratio gappers as a speed ratio relative to a speed of the adjacent downstream one of said conveying surfaces, each of said ratio-gappers controlling the associated one of the speed ratios at least partially upon the distance between a downstream edge of a control region of a first article on one of said conveying surfaces and an upstream edge of a control region of a second article on an adjacent one of said conveying surfaces downstream of said one of said conveying surfaces article and an available distance between at least one of the articles and a release location at said release conveyor; and
controlling a speed of said downstream-most conveying surface at a constant ratio with respect to a speed of the release conveyor.

21. The method of claim 20 wherein said control regions of the articles being centerlines of the articles, wherein the controlling a speed of one of said conveying surfaces includes each of the speed rations being based at least partially upon distance between the centerlines of the articles traveling through said induct subsystem.

22. The system of claim 1 wherein said control regions of the articles being centerlines of said first and second articles, wherein said ratio-gappers are adapted to control the speed of one of the conveying surfaces at least partially upon distance between the centerlines of the articles traveling through said induct subsystem.

23. The system of claim 15 wherein said control regions of articles being centerlines of the articles, wherein said ratio-gappers are adapted to control the speed of one of the conveying surfaces at least partially upon distance between the centerlines of the articles traveling through said induct subsystem.

* * * * *